United States Patent
Gentils et al.

(10) Patent No.: US 10,829,253 B2
(45) Date of Patent: Nov. 10, 2020

(54) METHOD FOR INCREASING THE DIELECTRIC WITHSTAND STRENGTH IN AN ELECTRICAL APPARATUS, AND APPARATUS HAVING AN IMPROVED DIELECTRIC STRENGTH ACCORDING TO THIS METHOD

(71) Applicant: Schneider Electric Industries SAS, Rueil Malmaison (FR)

(72) Inventors: Francois Gentils, Tullins (FR); Romain Maladen, Sinard (FR); Rainer Stein, Regensburg (DE)

(73) Assignee: Scheider Electric Industries SAS, Rueil Malmaison (FR)

( * ) Notice: Subject to any disclaimer, the term of this patent is extended or adjusted under 35 U.S.C. 154(b) by 580 days.

(21) Appl. No.: 15/453,572

(22) Filed: Mar. 8, 2017

(65) Prior Publication Data
US 2017/0291729 A1  Oct. 12, 2017

(30) Foreign Application Priority Data
Apr. 12, 2016 (FR) ...................... 16 53192

(51) Int. Cl.
*B65B 31/04* (2006.01)
*B65B 63/08* (2006.01)
(Continued)

(52) U.S. Cl.
CPC ................ *B65B 31/04* (2013.01); *B65B 3/04* (2013.01); *B65B 7/00* (2013.01); *B65B 31/02* (2013.01);
(Continued)

(58) Field of Classification Search
CPC .......... H02B 3/56; H02B 13/055; B65B 3/04; B65B 31/04; B65B 31/02; B65B 7/00; B65B 63/08
See application file for complete search history.

(56) References Cited

U.S. PATENT DOCUMENTS

2013/0221292 A1*  8/2013  Ingold ...................... H01B 3/56
                                                                252/571
2016/0043533 A1*  2/2016  Tehlar ...................... H02B 3/00
                                                                361/618

FOREIGN PATENT DOCUMENTS

| FR | 2 980 631 | 3/2013 |
| WO | WO 2012/080269 A1 | 6/2012 |
| WO | WO 2014/173776 A1 | 10/2014 |

OTHER PUBLICATIONS

French Preliminary Search Report dated Nov. 30, 2016 in French Application 16 53192, filed Apr. 12, 2016 (with English Translation of Categories of cited documents and Written Opinion).

* cited by examiner

*Primary Examiner* — Timothy J Thompson
*Assistant Examiner* — Amol H Patel
(74) *Attorney, Agent, or Firm* — Oblon, McClelland, Maier & Neustadt, L.L.P.

(57) ABSTRACT

A method for increasing the dielectric withstand strength in the enclosure E of an electrical apparatus, this method consisting in placing in the enclosure a dielectric material in liquid or solid form, then in bringing this material to a temperature and/or a pressure allowing for its total or partial evaporation in the enclosure. This method includes a device for retaining the abovementioned material in its container during the handling allowing the placement of the container in the enclosure E, and a device for inducing the evaporation of this material at a certain moment after this placement in (Continued)

Figure 1C:
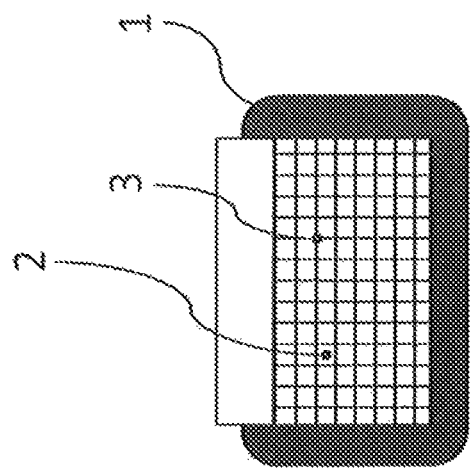

the enclosure E and for allowing the dispersion of the gases resulting from this evaporation in the enclosure E.

11 Claims, 10 Drawing Sheets

(51) Int. Cl.
*B65B 31/02* (2006.01)
*B65B 3/04* (2006.01)
*B65B 7/00* (2006.01)
*H01B 3/56* (2006.01)
*H02B 13/055* (2006.01)

(52) U.S. Cl.
CPC ............... *B65B 63/08* (2013.01); *H01B 3/56* (2013.01); *H02B 13/055* (2013.01)

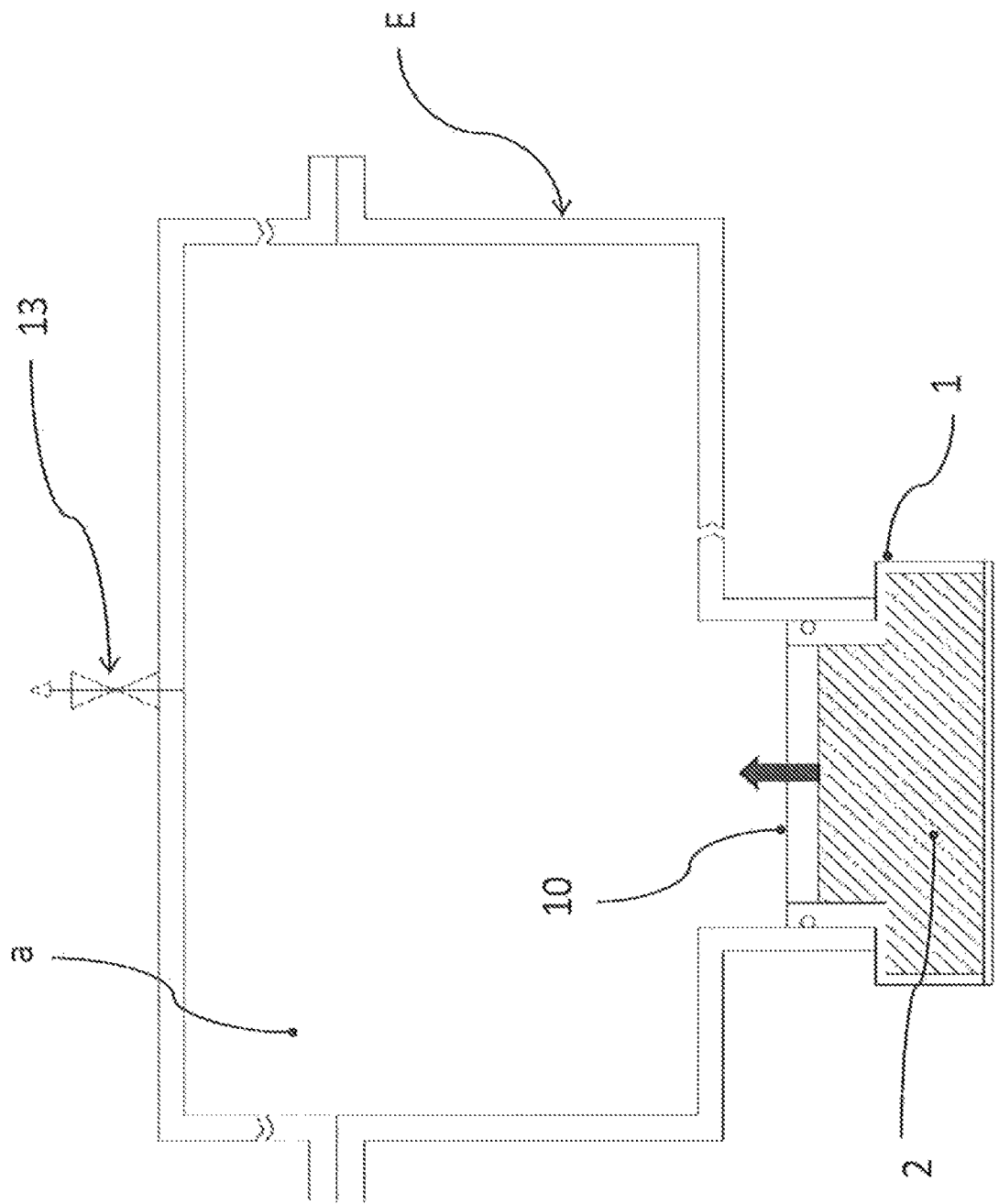

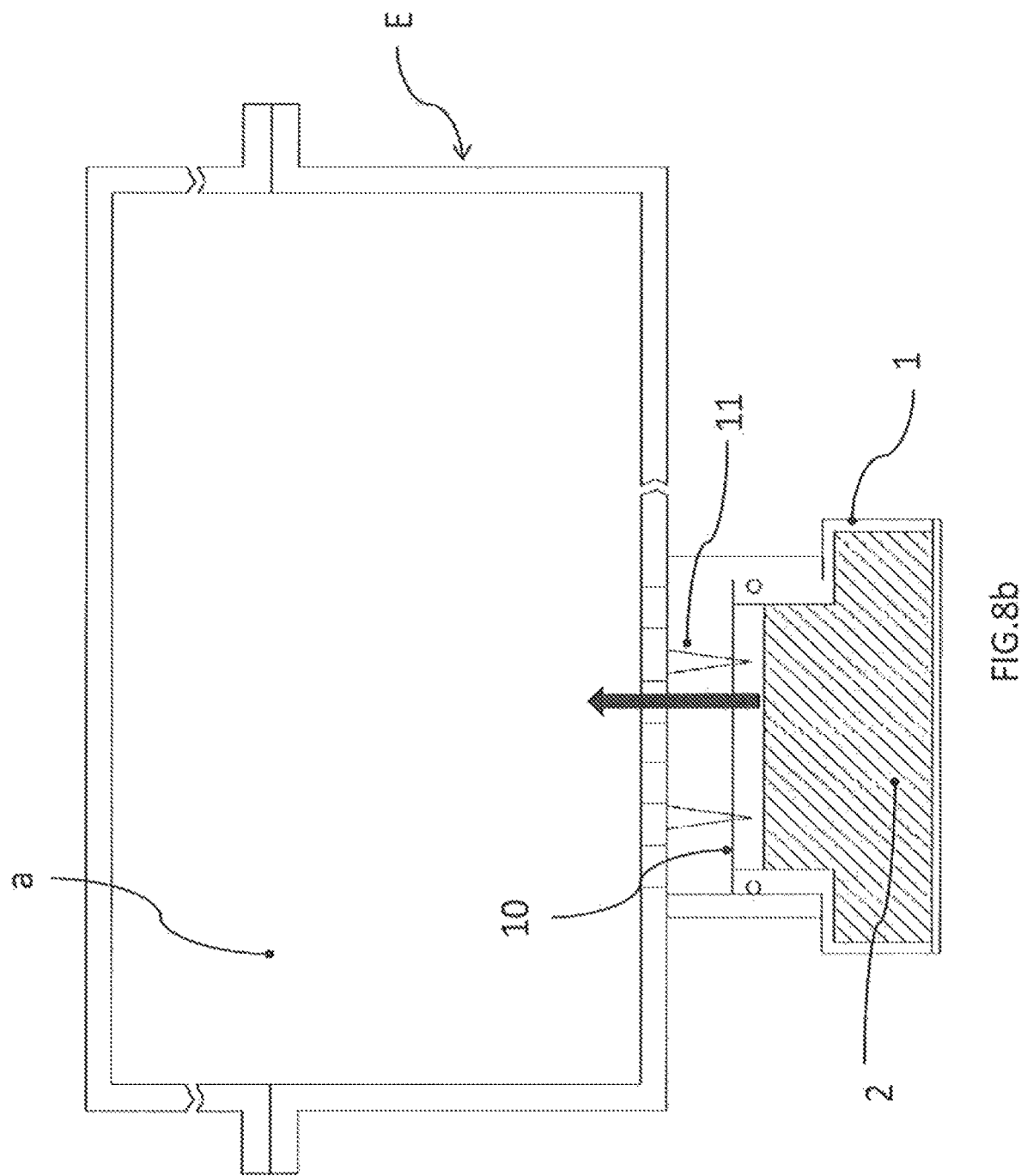

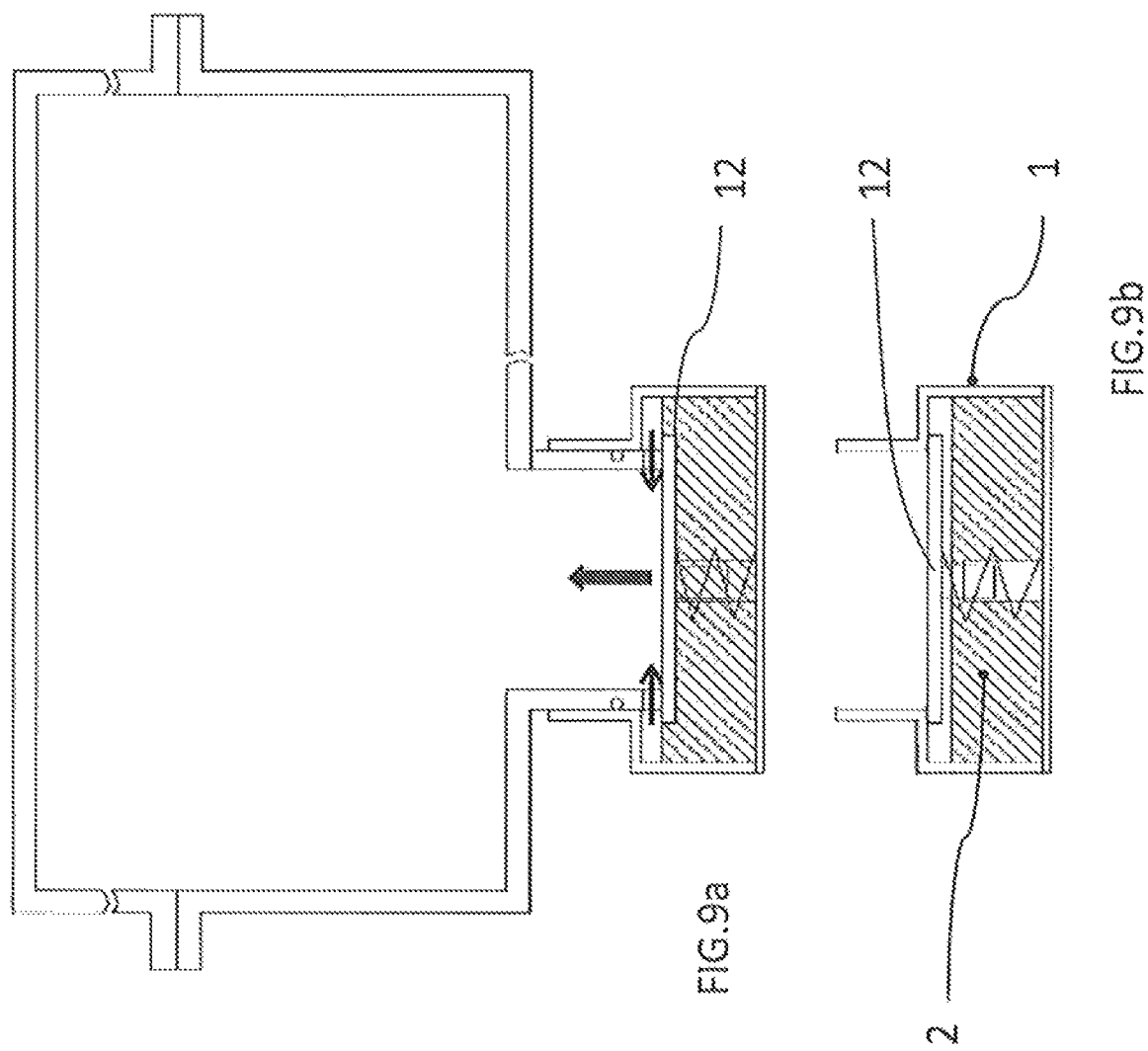

METHOD FOR INCREASING THE DIELECTRIC WITHSTAND STRENGTH IN AN ELECTRICAL APPARATUS, AND APPARATUS HAVING AN IMPROVED DIELECTRIC STRENGTH ACCORDING TO THIS METHOD

TECHNICAL FIELD

The present invention relates to a method for increasing the dielectric withstand strength inside the enclosure of an electrical apparatus, this method consisting in placing, inside said enclosure, a dielectric material in liquid or solid form, then in bringing this material to a temperature and/or a pressure allowing its total or partial evaporation inside the enclosure.

The present invention relates also to an electrical apparatus, in particular a medium or high voltage electrical protection apparatus, comprising an enclosure filled with a dielectric material in solid or liquid state, said enclosure being able to be opened so as to allow the introduction of said material, then to be closed and sealed so as to allow the evaporation of this material, then allow the gases resulting therefrom to be contained inside said enclosure.

STATE OF THE PRIOR ART

It is increasingly commonplace in the field of medium or high voltage electrical apparatuses, such as medium voltage circuit breakers, to seek to improve the dielectric performance levels of these apparatuses intended to be filled with ambient air, dry air or else a neutral gas.

One known solution consists in replacing the air with high-performance gases such as SF6 or fluoroketone (C5FK) for example. In effect, at equivalent pressure, the dielectric strength of air is between 2.5 and 3 times lower than that of SF6. These gases are always introduced in gaseous form.

Another solution consists in significantly increasing the pressure of the air or of the neutral gas.

Another solution consists in using insulating liquids in the form of oil.

Now, replacing the air with so-called high-performance gases generates significant design constraints (need to use valves, pressure gauges, etc.) and induces high complex industrial methods (use of gas cylinders, methods for creating vacuums, etc.) that it is preferable to avoid as far as possible.

In effect, the use of fluoroketone (C5FK) necessitates the implementation of a complex filling method. After the tank has been sealed, its content is discharged, then it is filled with C5FK, then a neutral gas is added up to a given pressure, which necessitates a pressure gauge and a valve.

Thus, upon the implementation of such methods, the filling of the apparatus with gas is performed after the vacuum has been achieved.

In addition to the above, there are increasing efforts to move away from the use of SF6 gas, given the assumed impact of this gas on the climate change effect, its global warming potential (GWP) being 22,800 times higher than that of CO2, which makes it the gas that has the greatest impact on the greenhouse effect.

When handling fluoroketone in the liquid state in an open filling method that is to be avoided given the risks of liquid spillage by the operators in the factory and of vaporization of gas in the workshops.

The present invention solves or mitigates these problems and proposes a method making it possible to improve the dielectric withstand strength inside the enclosure of an electrical apparatus, as well as an electrical apparatus having a dielectric withstand strength improved according to this method, this method being implemented easily without significant implementation constraints and by minimizing the exposure of the operators to the gas vapours.

SUMMARY OF THE INVENTION

To this end, the invention proposes a method of the kind previously mentioned, this method being characterized in that it comprises means for retaining the abovementioned material inside its container during the handling, allowing the placement of said container in the enclosure, and means for inducing the evaporation of this material at a certain moment after this placement in the enclosure and for allowing the dispersion of the gases resulting from this evaporation inside the enclosure.

According to a particular feature, this moment is one of the moments included in the group comprising: during the placement of the container or at the end of this placement, or during the closure and sealing of the enclosure or at the end of this closure, or upon the actuation of the apparatus: by the separation of a connection between the container and the enclosure, by an automatic opening means, by the implementation of a method for evacuating the container by pressurizing this container or else by perforation of a seal of the container.

According to a particular feature, the abovementioned evaporation is accelerated by the heating of the material to a certain temperature, this temperature being higher than ambient temperature or else lying between a temperature that can be reached in an industrial environment and ambient temperature.

The benefit of a temperature higher than ambient temperature lies primarily in the acceleration of the evaporation effect.

According to a particular feature, the abovementioned enclosure before the placement of the container is filled exclusively or non-exclusively with ambient air, dry air or else a neutral gas.

According to another embodiment, a vacuum is created inside said enclosure, then it is filled exclusively or non-exclusively with a pure gas or with a mixture containing N2, CO2 or O2 before the placement of the container or else after the placement of the container.

Yet another subject of the present invention is an electrical apparatus comprising an enclosure intended to be filled with a dielectric material in the solid or liquid state, said enclosure being able to be opened so as to allow the introduction of said material, then to be closed and sealed so as to allow the evaporation of this material, this apparatus being characterized in that the dielectric withstand strength inside the enclosure is increased according to a method comprising the features mentioned taken alone or in combination.

According to a particular embodiment, these means for retaining said material comprise an absorbent substrate filled with a dielectric liquid and transported in a tight packaging, then removed from its packaging before being placed in the enclosure just before the closure of said enclosure.

According to another particular embodiment, these means for retaining said material comprise a closed container intended to contain a dielectric liquid or solid, and a means for perforating the container, this means being housed in the enclosure, said container being intended to be perforated by said means upon the closure of the enclosure or else upon the actuation of the apparatus, after one or more actuation manoeuvres.

According to a particular feature, the abovementioned liquid is a fluorinated liquid.

According to another feature, the boiling point of the liquid is substantially 49° C.

According to another feature, this fluid is fluoroketone C6 or C6FK.

According to another feature, this apparatus is an electrical protection apparatus.

According to another feature, this apparatus is a medium or high voltage electrical protection apparatus.

DESCRIPTION OF SEVERAL EMBODIMENTS ACCORDING TO THE INVENTION

Figure 1B:
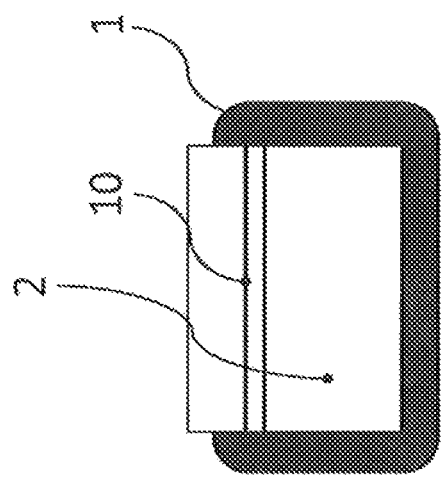
Figure 1A:
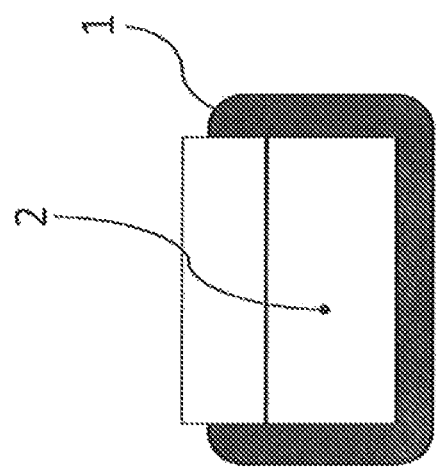

However, other advantages and features of the invention will become more apparent from the following detailed description which refers to the attached drawings given purely by way of example and in which:

FIGS. 1a-1c, FIG. 2 and FIG. 3 are schematic representations illustrating the method according to the invention in the principle thereof, according to three different embodiments represented respectively in FIGS. 1a, 1b and 1c.

Figure 10A:
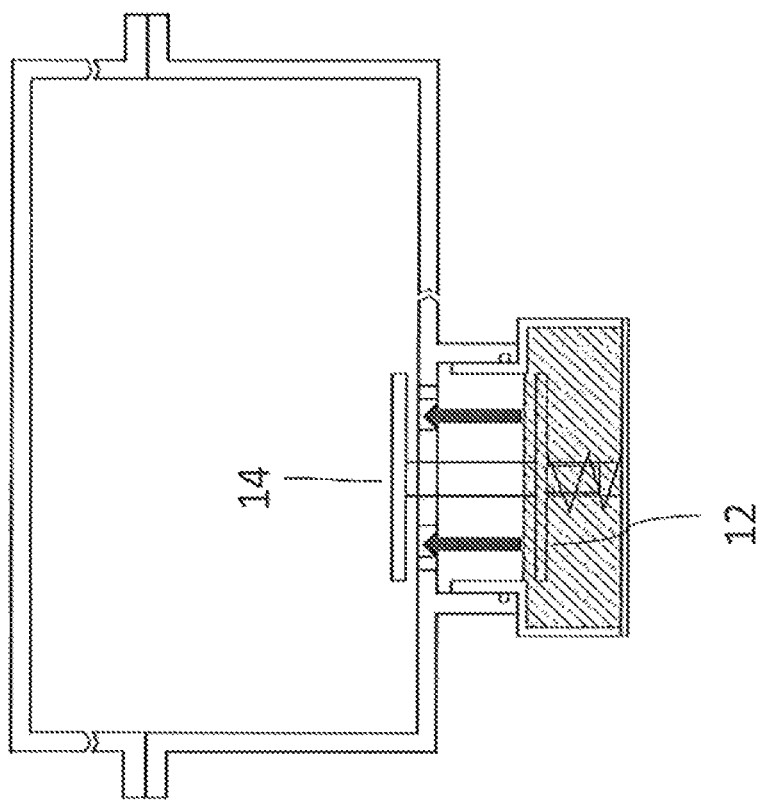
Figure 10B:
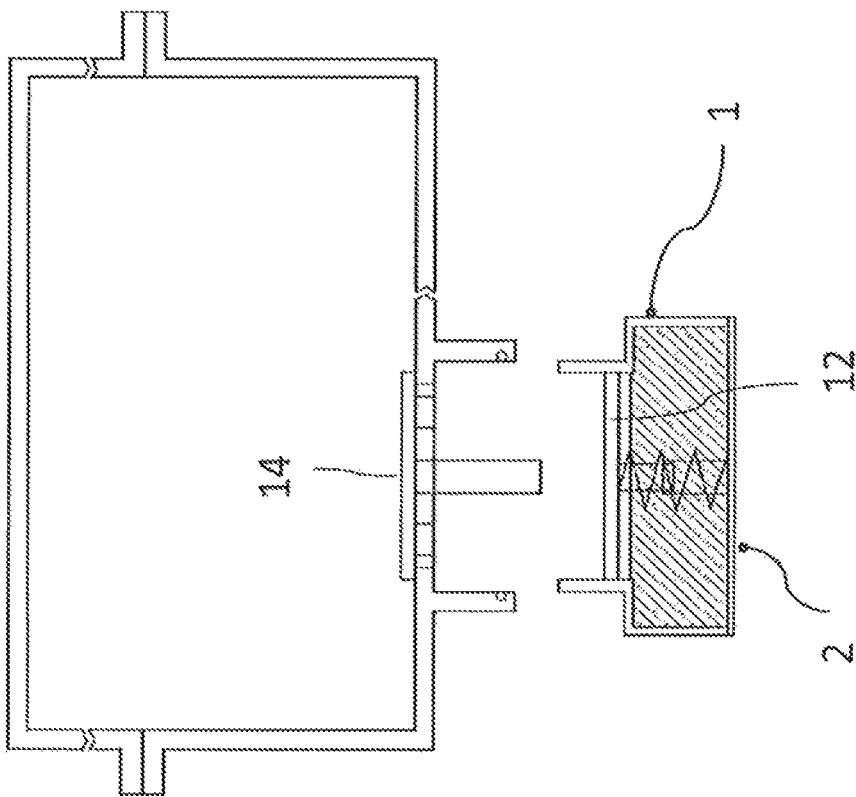

FIGS. 4, 5, 6, and 7 illustrate the different steps of a method according to a particular embodiment of the invention, FIGS. 8, 9 and 10 respectively schematically illustrate three other embodiments of the method according to the invention, and FIGS. 8a, 8b, 9a, 9b and 10a, 10b correspond respectively to the different steps of these two embodiments.

Figure 2:
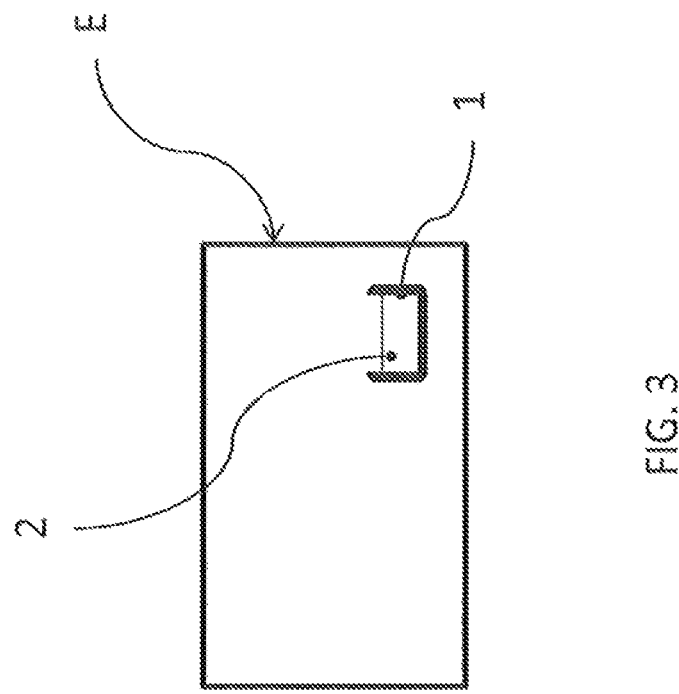
Figure 3:
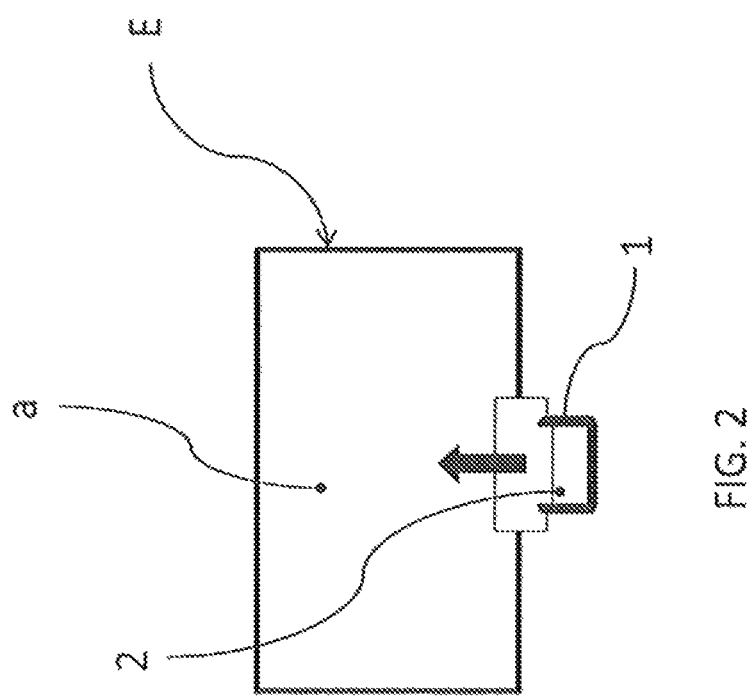

FIGS. 1 to 3 illustrate a method according to the invention making it possible to improve the dielectric withstand strength inside an enclosure E belonging to a medium or high voltage electrical apparatus, such as a medium voltage circuit breaker, this enclosure being, in this particular embodiment, previously filled with air.

A first step of this method consists in obtaining an open container 1 so as to allow the filling thereof with a dielectric material 2 in the solid or liquid state, this container being able to be left open, as illustrated in FIG. 1a, being able to be closed and sealed as illustrated in FIG. 1b, or else suitable for receiving a porous substrate such as a sponge 3, said substrate being filled with a dielectric liquid.

A second step of this method illustrated in FIG. 2, consists in introducing this container 1 inside the enclosure E of the apparatus at ambient temperature or at a temperature lower than ambient temperature in an air-conditioned room, these temperatures being lower than the boiling point of the liquid.

According to a third step described in FIG. 3, the enclosure E is closed and sealed, and the evaporation of liquid can occur, the heating of the enclosure above ambient temperature being able to accelerate the evaporation effect.

The gas vapours thus released upon this evaporation mix with the air, which increases the dielectric efficiency of the apparatus.

According to a second embodiment of the invention illustrated in FIGS. 4 to 7, the abovementioned enclosure E comprises a bottom part 4 and a top part 5, these two parts each supporting electrical conductors 6.

This bottom part 4 comprises a housing 7 intended to receive a bag 8, said bag being intended to contain a dielectric liquid.

Figure 4:
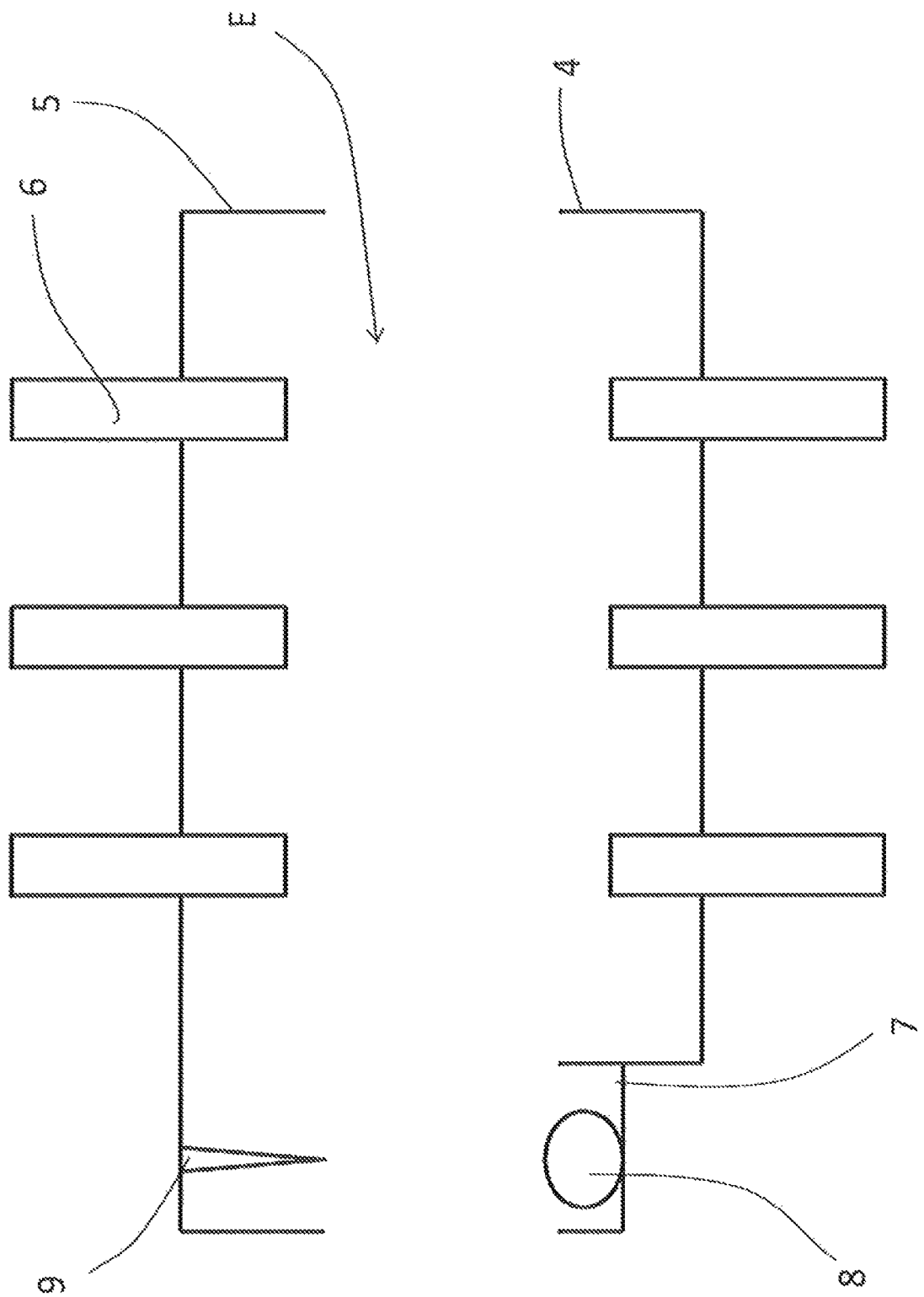

In FIG. 4, the enclosure E is in open position having allowed the introduction of the abovementioned bag 8.

Figure 5:
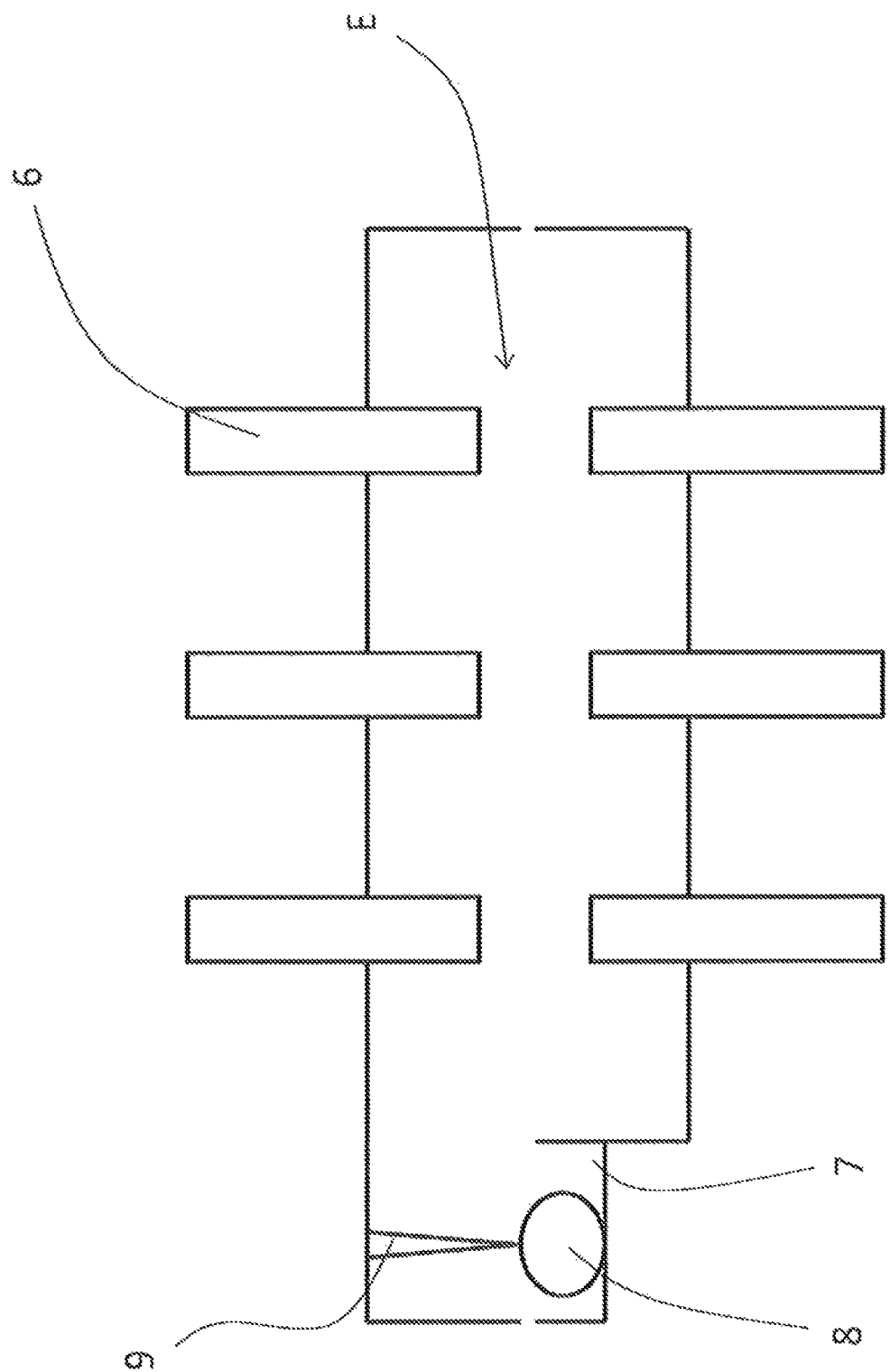

The top part 5 comprises a needle-shaped part 9 suitable for perforating the abovementioned bag 8 upon the closure of the enclosure E, the step illustrated in FIG. 5.

Thus, this perforation can be done either upon the closure of the enclosure E, or by providing a specific shape on the mobile part 5 of the enclosure E, this specific shape being suitable for perforating the container 1 by the actuation of a mechanical control (not represented) provided in the enclosure.

Figure 6:
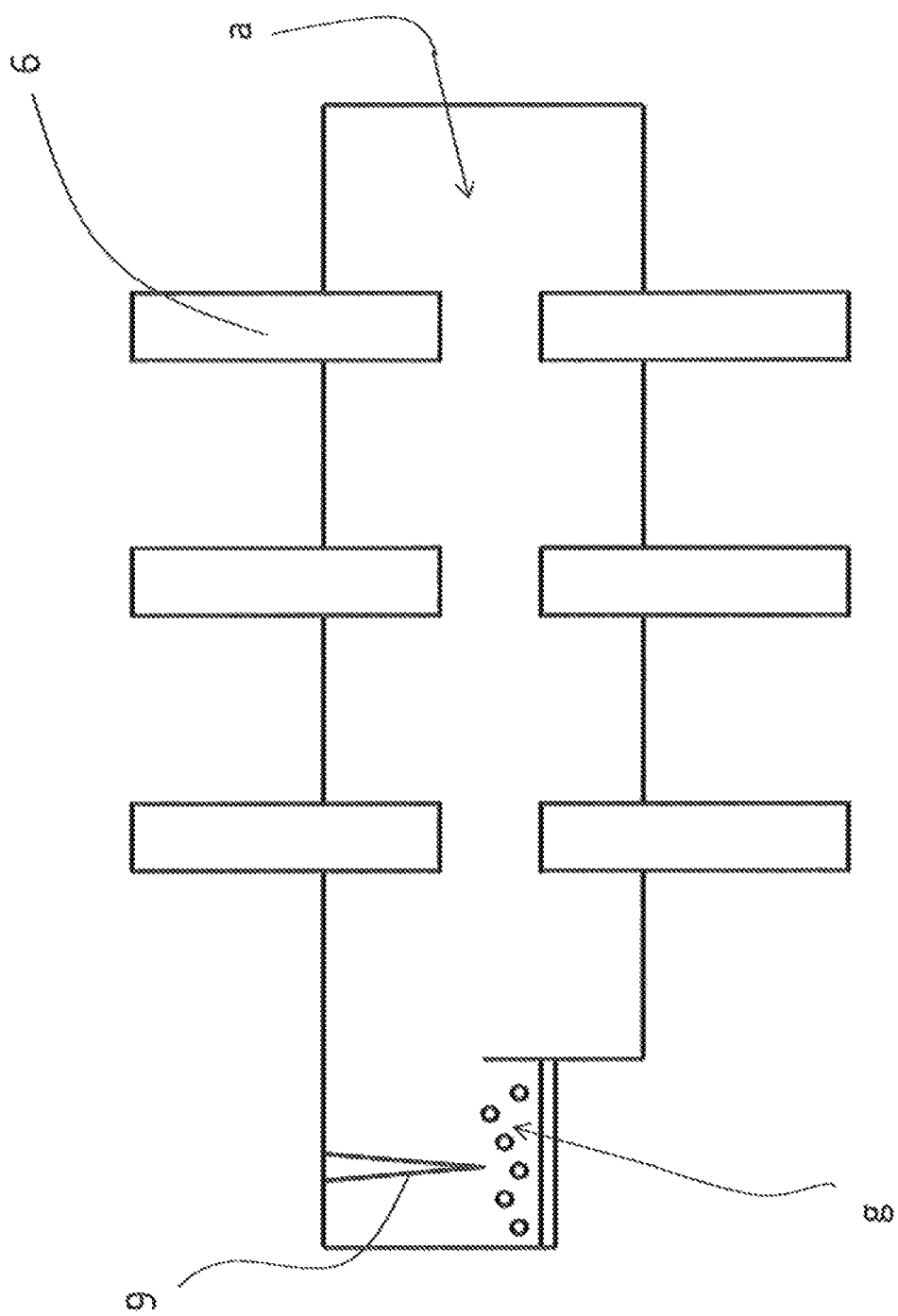

In FIG. 6, the enclosure E is closed and allows for the release of the gas vapours.

Figure 7:
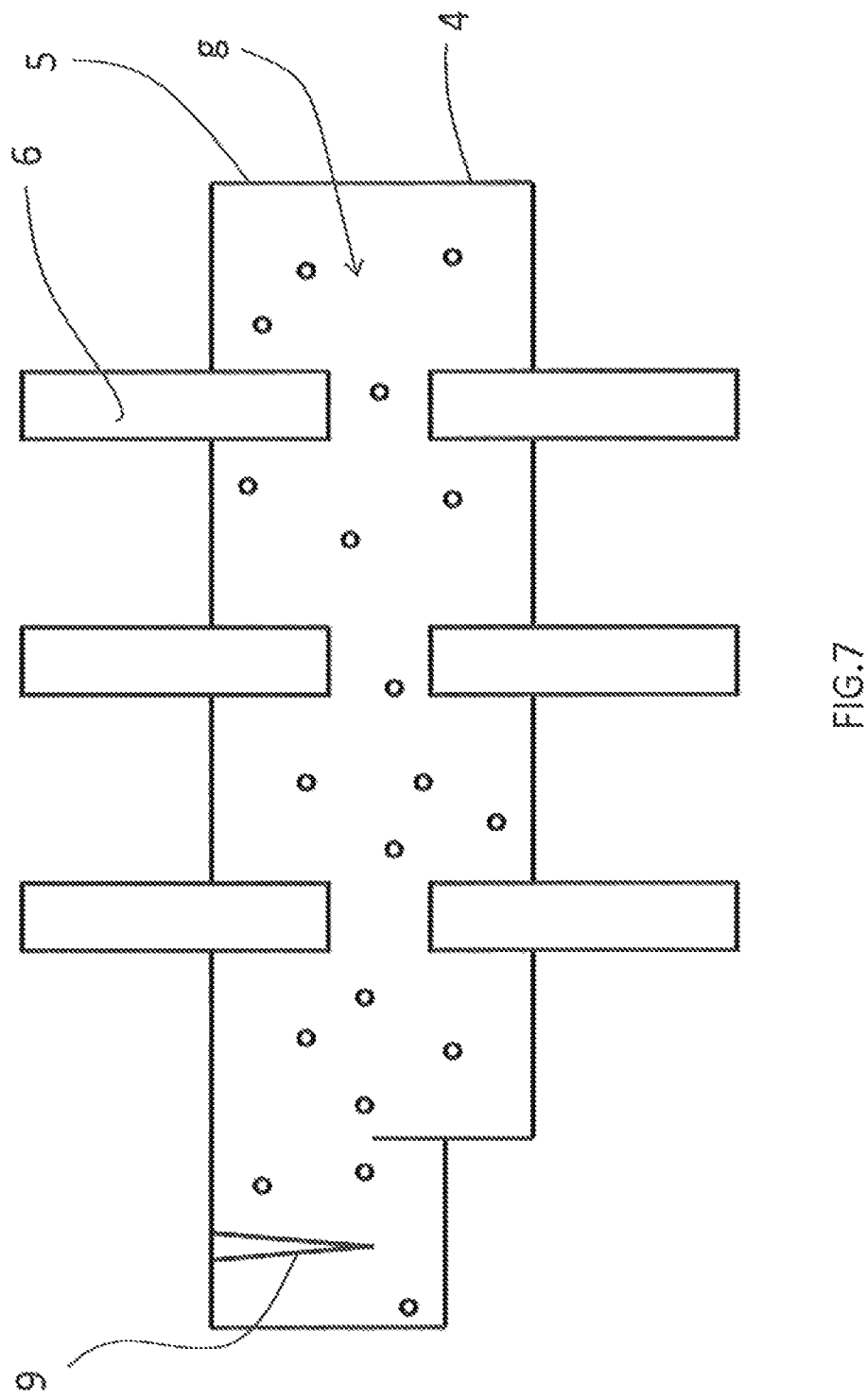

In FIG. 7, after a certain time, depending on the temperature, the dielectric material is totally or partially in the gaseous state. The apparatus is ready to be used.

According to another embodiment illustrated in FIG. 8, the container 1 and the enclosure E are linked to one another by a connection zone z, the communication between the two being prevented by the fact that the container 1 is closed by a sheet 10 made of a material such as aluminium, this sheet being able to be perforated by the actuation of a mechanical means provided for this purpose in the enclosure E leading to the displacement of the needle-forming elements 11, so as to establish the communication between the enclosure and the container.

Thus, in FIG. 8a, the communication is prevented by the presence of this sheet 10. The enclosure E comprises, in its top part, a valve 13 intended to evacuate the enclosure before it is filled with N2 gas for example. In FIG. 8b, the communication is in the process of being established by perforation of this sheet 10.

In FIG. 9, the connection zone z comprises a valve 12 suitable for establishing the connection between the container 1 and the enclosure E when the latter are joined to one another.

Thus, in FIG. 9a, the valve 12 is in the open state, whereas in FIG. 9b, the valve 12 is in the closed state.

In FIG. 10, the connection zone z comprises two valves 12 and 14 suitable for establishing the connection between the container 1 and the enclosure E when the latter are joined to one another.

Thus, in FIG. 10a, the valves 12 and 14 are in the closed state, whereas in FIG. 10b, the valves 12 and 14 are in the open state after the connection between the enclosure E and the container 1.

In all these embodiments, the use of a heating method in the cell makes it possible to accelerate the evaporation.

These gas vapours g mixed with the air present in the enclosure E exhibit a dielectric strength greater than that of the pure air, at the same pressure.

For example, 0.060 bar at 20° C. of fluoroketone C6FK gives the same dielectric efficiency as approximately 0.300 bar of SF6.

Thus, there is no need to place a significant quantity of fluoroketone C6FK for example to significantly improve the dielectric withstand strength of an average or high voltage apparatus.

Thus, since this added dielectric material is liquid at ambient temperature (having, for example, a boiling point of 49° C. in the case of C6FK), it can be handled in the liquid state and not in the gaseous state, which is very useful from an industrial point of view. With such a quantity and given the saturating vapour pressure curve, it is possible to guarantee both that this liquid will be totally evaporated in the tank in which it will be placed in the liquid state and that this material will remain in the liquid state from the highest temperatures of use to 15'C. Obviously, this low value will be able to be adjusted by modifying the partial pressure of this material or by selecting another material. For a cell volume of 30 litres, it is necessary to add approximately 15 ml of liquid C6FK to achieve the pressure previously mentioned.

Dielectric materials other than that described in the abovementioned description can be used, these materials preferably having the following properties:
  a global warming potential (GWP) lower than 3000
  a boiling point lower than 60° C.
  a toxicity (TWA) higher than 50 ppm
  a material classification in non-flammable products.

The list below itemizes different possible families of chemical materials, which could be advantageously used:
  hydrofluoroethers (HFE),
  hydrofluoroolefins (HFO),
  fluoroketones.

The implementation of the method of the invention according to the embodiment described previously in which the porous substrate is a sponge, which is, in the broadest sense, a porous substrate, could be as follows:

Chemical material manufacturer (or a subcontractor specializing in the packaging of chemical products) supplies a sponge containing the exact quantity of insulating liquid for a given apparatus. So as to avoid any vaporization during transportation and storage, this sponge is packed in a tight packaging or a bag.

During the assembly phase, the users open this bag and place the sponge in the cell just before its closure. Since the boiling point of this insulating liquid is high, the vaporization is very slow, which leaves the user sufficient time to close the enclosure.

Advantageously, the boiling point could be between 0 and 60° C.

According to another embodiment, the container is a tight package or a bag which contains the exact quantity of liquid necessary to fill the tank. During the assembly phase, this tight packaging or bag is arranged in a specific place inside the tank and, when the lid for closing the tank is put in place, an element of this lid perforates the tight packaging or the bag, which induces the release of the liquid vapours.

A method has therefore been carried out according to the invention making it possible to increase the dielectric withstand strength of the air or other neutral gas introduced into the enclosure (in the pressurized state or at atmospheric pressure or below atmospheric pressure) in a tight enclosure belonging to a medium or high voltage electrical apparatus, by using an additional cartridge which must be placed in the cell before the enclosure is sealed.

This implementation method is particularly simple and inexpensive avoiding any complex procedures such as the creation of a vacuum, the use of valves and other injection and emptying methods.

By virtue of this last method (tight packaging or bag), the user no longer has any contact with the liquid during assembly or in an uncontrolled vaporization. There is no time constraint before the placing of the container in the enclosure, the sealing of the enclosure and the opening of the container.

The invention therefore proposes a technical solution for depositing the insulating material easily inside the apparatus.

In the case where the container is a sponge for example, the user no longer has to handle the fluorinated liquid, which previously necessitated precision, the taking of precautions, management and storage of the cylinders. The user simply needs to handle the sponges by using gloves, handling sponges being easier than handling a liquid.

The solution consisting in using a container that can be perforated is the safest from the point of the safety of the user, because the latter is never in contact with the fluid and its vapours.

The invention applies advantageously to any electrical apparatus comprising an enclosure comprising a dielectric function.

The invention applies particularly to any medium voltage electrical protection apparatus such as a circuit breaker, a switch, a busbar, etc.

Obviously, the invention is not limited to the embodiments described and illustrated which have been given purely by way of example.

On the contrary, the invention comprises all the technical equivalents of the means described as well as their combinations provided the latter are produced according to the spirit thereof.

The invention claimed is:

1. A method for increasing the dielectric withstand strength inside an enclosure of an electrical apparatus, said method comprising:
  placing, inside said enclosure, a dielectric material in liquid or solid form, then in bringing said material to a temperature and/or a pressure allowing for its total or partial evaporation inside the enclosure,
  retaining said material inside a container during handling allowing placement of said container in the enclosure, and in inducing the evaporation of said material at a certain moment after said placement in the enclosure and allowing the dispersion of gases resulting from said evaporation inside the enclosure.

2. The method according to claim 1, wherein said moment is one of the following moments: during the placement of the container or at the end of said placement, or during the closure and sealing of the enclosure or at the end of said closure, or upon the actuation of the apparatus: by the separation of a connection between the container and the enclosure, by an automatic opening means, by the implementation of a method for evacuating the container by pressurizing said container or else by perforation of a seal of the container.

3. The method according to claim 1, wherein the evaporation is accelerated by heating of the material to a certain temperature, said temperature being higher than ambient temperature or else lying between a temperature that can be reached in an industrial environment and ambient temperature.

4. The method according to claim 1, wherein the enclosure before the placement of the container, is at least partly filled with ambient air, dry air or else a neutral gas.

5. The method according to claim 1, wherein a vacuum is formed inside said enclosure, then it is filled at least partly with a pure gas or with a mixture containing N2, CO2, or O2 before the placement of the container or else after the placement of the container.

6. The method according to claim 1, wherein the method further comprises retaining said material inside its container, by an absorbent substrate filled with a dielectric liquid and a tight packaging capable of transporting said substrate and from which said substrate can be removed before being placed in the enclosure just before the closure of said enclosure.

7. The method according to claim 1, wherein the method further comprises retaining said material inside its container, by including a closed container intended to contain a dielectric liquid or solid, and a means for perforating the container, this means being housed in the enclosure, said container being perforatanble by said means upon the closure of the enclosure or else upon the actuation of the apparatus, after one or more actuation manoeuvres.

8. The method according to claim 1, wherein the liquid is a fluorinated liquid.

9. The method according to claim 1, wherein the boiling point of the liquid is substantially 49° C.

10. The method according to claim 1, wherein the fluid is fluoroketone C6 or C6FK.

11. The method according to claim 1, wherein said electrical apparatus is a medium or high voltage electrical protection apparatus.

* * * * *